Patented Aug. 26, 1952

2,608,573

UNITED STATES PATENT OFFICE 2,608,573

XANTHOGEN COMPOUNDS

Arthur H. Fischer, New York, N. Y., assignor to Minerec Corporation, New York, N. Y., a corporation of New York No Drawing. Application June 2, 1948, Serial No. 30,743

7 Claims. (Cl. 260—455)

This invention relates to the production of new organic compounds and has for an object the provision of novel xanthogen formates. More particularly, the invention contemplates the provision of novel alkyl xanthogen formates. A specific object of the invention is to provide xanthogen formates having a saturated alkyl radical as a substituent of the xanthogen moiety and a radical as a substituent of the formate moiety which is more polar than an ethyl group would be if present as such a substituent. A further object of the invention is to provide xanthogen formates having a saturated alkyl radical as a substituent of the xanthogen moiety and an organic radical, as a substituent of the formate moiety, which comprises polar substituents. Another object of the invention is to provide a method of producing xanthogen formates.

The reagents of the invention may be produced by reacting alkyl xanthates comprising saturated alkyl radicals with chloroformates comprising organic radicals containing polar substituents in accordance with the following equation:

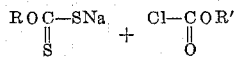

In the formulas set forth above, R is an alkyl radical containing not less than two carbon atoms and R' is an organic radical comprising one or more polar substituents. R preferably is an alkyl radical comprising from two to six carbon atoms, and R' preferably is an organic radical comprising one or more polar substituents of the group consisting of halogen atoms, cyanogen radicals (CN), and nitro radicals (NO$_2$). R' may be either a saturated radical or an unsaturated radical. If saturated, R' may contain one to six carbon atoms, and, if unsaturated, R' may contain two to six carbon atoms.

The compounds of the invention may be employed for various purposes. They may be employed with particular advantage as mineral collecting agents in the concentration of minerals by froth flotation. Among the compounds found to be most effective for use in such concentration processes are those having as the substituent the xanthogen moiety ethyl, propyl, butyl, amyl and hexyl radicals or having as the substituent of the formate moiety substituted methyl, ethyl, propyl, butyl, amyl or hexyl radicals comprising polar substituents.

Flotation processes involving the use of the compounds of the invention are described and claimed in my copending application Serial No. 30,742, filed June 2, 1948.

The following example illustrates a method of preparing compounds in accordance with my invention:

71 grams of re-crystallized potassium ethyl xanthate were dissolved in 70 c. c. of water to form a saturated solution. 64.7 grams of 96.57 percent pure chloro ethyl chloroformate were added to the solution rapidly with constant stirring. The temperature of the reaction mixture rose from 25° C. to 55° C. Stirring was continued for two hours during which time the temperature of the reaction mixture dropped to room temperature. Reaction of the chloro ethyl chloroformate with the potassium ethyl xanthate produced an oily reaction product immiscible with the water contained in the reaction mixture. Upon standing the oily product and the aqueous liquid formed separate layers or strata. The oily product was separated from the aqueous liquid, dried and weighed. The yield was 95.0 grams of ethyl xanthogen chloro ethyl formate, equivalent to 95 percent of the theoretical yield in accordance with the following equation:

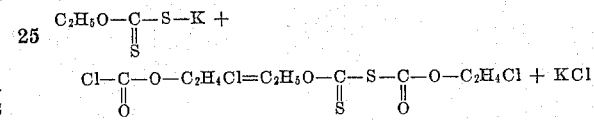

The oily product was substantially pure ethyl xanthogen chloroethyl formate, as indicated by comparisons of sulphur and chlorine contents of the oily product obtained by analysis with the theoretical sulphur and chlorine contents.

I claim:

1. A compound having the structural formula—

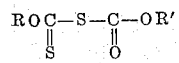

in which R is an alkyl radical containing from two to six carbon atoms and R' is an aliphatic radical containing from one to six carbon atoms and comprising a polar substituent of the group consisting of halogen, cyanogen and nitro.

2. A compound having the structural formula—

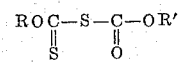

in which R is an alkyl radical containing from two to six carbon atoms and R' is an aliphatic radical containing from one to six carbon atoms and comprising chlorine as a substituent.

3. A compound having the structural formula—

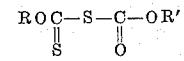

in which R is an ethyl radical and R' is an ethyl radical comprising chlorine as a substituent.

4. A compound having the structural formula—

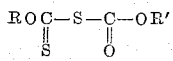

in which R is a butyl radical and R' is an ethyl radical comprising chlorine as a substituent.

5. A compound having the structural formula—

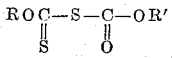

in which R is a hexyl radical and R' is an ethyl radical comprising chlorine as a substituent.

6. A compound having the structural formula—

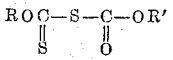

in which R is an alkyl radical containing from two to six carbon atoms and R' is an aliphatic radical containing from one to six carbon atoms and comprising a cyanogen radical as a substituent.

7. A compound having the structural formula—

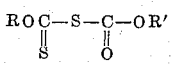

in which R is an alkyl radical containing from two to six carbon atoms and R' is an aliphatic radical containing from one to six carbon atoms and comprising a nitro radical as a substituent.

ARTHUR H. FISCHER.

REFERENCES CITED

The following references are of record in the file of this patent:

UNITED STATES PATENTS

| Number | Name | Date |
|---|---|---|
| 1,684,536 | Fischer | Sept. 18, 1928 |
| 1,796,972 | Whitby | Mar. 17, 1931 |
| 2,070,634 | Werntz | Feb. 16, 1937 |
| 2,368,670 | Lincoln et al. | Feb. 6, 1945 |
| 2,412,500 | Fischer | Dec. 10, 1946 |

OTHER REFERENCES

Gilman, ed.: "Organic Chemistry," 2d ed. 1943, vol. II, p. 1841.